US007763860B2

(12) United States Patent
Waller

(10) Patent No.: US 7,763,860 B2
(45) Date of Patent: Jul. 27, 2010

(54) OROFACIAL RADIATION DETECTION DEVICE FOR DETECTION OF RADIONUCLIDE CONTAMINATION FROM INHALATION

(75) Inventor: Edward Joseph Waller, Burketon (CA)

(73) Assignee: University of Ontario Institute of Technology, Oshawa, Ontario (CA)

( * ) Notice: Subject to any disclaimer, the term of this patent is extended or adjusted under 35 U.S.C. 154(b) by 0 days.

(21) Appl. No.: 12/314,709

(22) Filed: Dec. 15, 2008

(65) Prior Publication Data

US 2009/0159807 A1   Jun. 25, 2009

Related U.S. Application Data

(60) Provisional application No. 61/006,021, filed on Dec. 14, 2007.

(51) Int. Cl.
*H01L 27/146* (2006.01)
*G01T 1/24* (2006.01)

(52) U.S. Cl. .............................. 250/370.13; 250/370.02
(58) Field of Classification Search ............ 250/370.13, 250/374, 370.02, 522.1, 532
See application file for complete search history.

(56) References Cited

U.S. PATENT DOCUMENTS

| 4,706,683 | A | * | 11/1987 | Chilton et al. ............... 600/431 |
| 5,081,871 | A | * | 1/1992 | Glaser ....................... 73/863.23 |
| 5,218,208 | A | | 6/1993 | Augier |
| 7,126,121 | B1 | | 10/2006 | McGlothlin |
| 7,465,925 | B2 | * | 12/2008 | Antanovskaya et al. .. 250/336.1 |
| 2002/0196202 | A1 | * | 12/2002 | Bastian et al. ................. 345/8 |
| 2003/0065275 | A1 | * | 4/2003 | Mault et al. .................. 600/531 |
| 2007/0107732 | A1 | * | 5/2007 | Dennis et al. .......... 128/206.21 |
| 2007/0199567 | A1 | * | 8/2007 | Kanzer .................. 128/206.21 |

OTHER PUBLICATIONS

"A Generic Standard Operating Procedure: Radiation Detection and Metering", Homeland Security Committee Documents, Health Physics Society, Jun. 25, 2004; pp. 1-4.
Bushberg et al., "Chapter 25: Hospital Responses to Radiation Casualties", Health Physics Society, 2004, p. 445-462.

* cited by examiner

*Primary Examiner*—David P Porta
*Assistant Examiner*—Faye Boosalis
(74) *Attorney, Agent, or Firm*—Lynn C. Schumacher; Hill & Schumacher

(57) ABSTRACT

The present invention provides an orofacial radiation detection device for detection of radionuclide contamination from inhalation. The device includes a face mask including a support frame and an adjustable head strap connected to the support frame. Mounted on the frame are radiation detectors in selected locations so that when being worn by a person, the detectors are located in close proximity to the orofacial region of the person including their nose and mouth. The device includes an electronic controller connected to the detectors for controlling operation of the radiation detectors. The device includes a microcomputer mounted on the support frame and electrically connected to the electronic controller for processing signals from the detectors for allowing input from an operator, performing data analysis and detection algorithms, and outputting results. The detectors include beta and gamma detectors that, utilizing appropriate hardware processing and software algorithms, are able to determine if radionuclides are present in the orofacial area of a person suspected to have been exposed to airborne contamination.

22 Claims, 6 Drawing Sheets

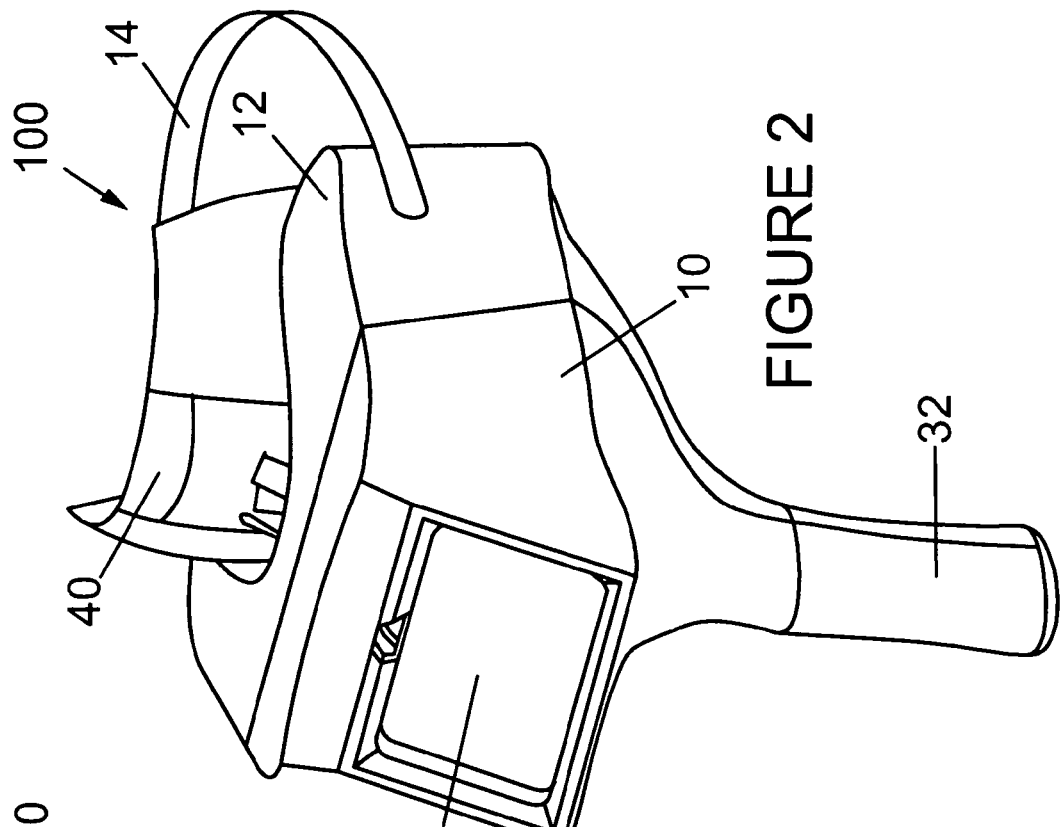
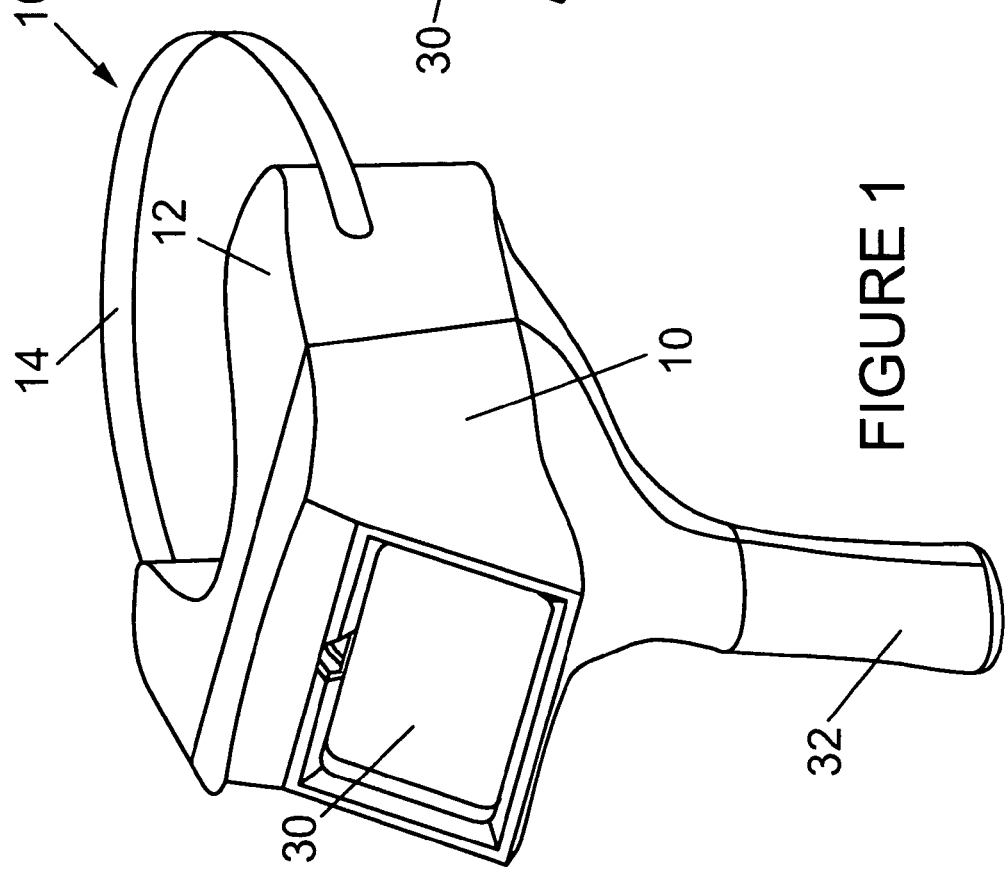

OROFACIAL RADIATION DETECTION DEVICE FOR DETECTION OF RADIONUCLIDE CONTAMINATION FROM INHALATION

CROSS REFERENCE TO RELATED U.S PATENT APPLICATION

This patent application relates to, and claims priority from, U.S. Provisional Patent Application Ser. No. 61/006,021 filed on Dec. 14, 2007 entitled OROFACIAL RADIATION DETECTION DEVICE FOR DETECTION OF RADIONUCLIDE CONTAMINATION FROM INHALATION, filed in English, which is incorporated herein in its entirety by reference.

FIELD OF THE INVENTION

The present invention relates to orofacial radiation detection devices for rapid triage of personnel at risk of internal radionuclide contamination from inhalation.

BACKGROUND OF THE INVENTION

A radiological dispersal device (RDD) is a device which spreads radioactive material over a wide area. There may be several forms of RDD, one being a dirty bomb which uses explosives to scatter radioactive material. Another type is an atmospheric device in which radioactive material is converted into a form that is transported by air currents. Radiological dispersal devices can result in human casualties by inhaling the radioactive material.

There are four primary entry routes of radionuclides into the body, including inhalation, ingestion, skin absorption and wound absorption. Once intaken (to the body), radionuclides must be uptaken (by cells) for any significant internal dose to be realized. The physiological retention and clearance of radionuclides is influenced by 1) mode of entry into the body, 2) radionuclide chemistry; 3) particle size of the radionuclide particles. Once uptaken, a radionuclide will irradiate surrounding tissues until it: 1) is excreted through physical processes (urine or feces), 2) is eliminated via radioactive decay, or 3) is removed via treatment (decorporation or wound debridement).

One of the greatest health risks from terrorist use of a radiological dispersal device (RDD) is from inhalation of radionuclide aerosol particulate after a high energy event (explosive, liquid or powder release). Although there are a number of strategies available to medically decorporate radionuclides from the body, their efficacy relies on the fact that they can be administered to patients rapidly (within hours) after the intake occurs. The appropriate therapeutic treatment regime depends primarily on the rapid identification of the radioisotope involved (for example, Cs-137, Co-60, Ir-192 etc).

The standard therapies for treatment include saturation of the target organ (ex. KI), complex formation at the site of entry or in body fluids followed by rapid excretion (ex. DTPA), acceleration of metabolic cycle of radionuclide by isotope dilution (ex. water), precipitation of radionuclide in intestinal lumen followed by faecal excretion (ex. $BaSO_4$), ion exchange in gastrointestinal tract (ex. Prussian blue).

Of critical importance is the timing of the treatment so that administration of decorporating agents can be made as early as possible after uptake. In emergency situations where many people may be affected there is not generally sufficient time for detailed laboratory dose assessments prior to administering a standard protocol after intake. Currently, the decision to treat is therefore subjective and based upon experience, and therefore the risk is high that the assessment and treatment decisions may be wrong. Thus, first responders must weigh the small risk of the treatment against the potential aversion of dose. As discussed, treatment efficacy is highly dependent on time of treatment after insult. Also, it would be very desirable to rapidly clear people from the scene (mitigate "worried well" phenomena).

The first responders in such a scenario would be the nurses and doctors at the local hospital emergency rooms and the first people to arrive on the scene (firemen, police officers, EMT, etc) who typically would have little-to-no knowledge in health physics particularly as it relates to radiation hazards. The ability to treat is limited since the first responders own personal safety may be compromised. Common tools used by first responders in a radiation emergency are personal dosimeters and radiation survey meters.

Thus, unfortunately, first response personnel (EMS, fire fighters, police, nurses, etc) do not have the equipment and more importantly the expertise to perform rapid radionuclide assessment in the field. Therefore, by the time the isotopic contribution(s) is/are determined, the radionuclides will have been incorporated into intracellular fluids and are extremely difficult to remove from the body.

Operational experience has shown that personnel who have inhaled this type of material will have impaction transfer in the upper nasal-pharynx region, and therefore a positive indication from a filter-mask type device placed over the nose and mouth would be enough to indicate that decorporation for the specific radionuclide is recommended. It is believed that no such similar device currently exists and that this type of device, which would be simple enough such that minimally trained non-experts could use it, would be an immediately realizable asset to first responders that may be called upon to provide medical assistance after an RDD scenario.

From a medical perspective, the biggest challenge for the treating physicians is: 1) finding out what radioisotope is involved, and then, 2) whether the exposure is great enough to warrant treatment. Early treatment is essential for maximizing the potential of the drugs involved.

It would be very advantageous to provide radiation detection devices for rapid triage of personnel at risk of internal radionuclide contamination from inhalation.

SUMMARY OF THE INVENTION

The present invention provides a half-face mask device which incorporate any combination of alpha, beta and gamma detectors that is, utilizing appropriate hardware processing and software algorithms, able to determine if radionuclides are present in the orofacial area of a person suspected to have been exposed to airborne contamination.

Thus, the present invention provides an orofacial radiation detection device for detection of radionuclide contamination from inhalation, comprising:

a) a housing shell and a support frame, said support frame being contoured to cover an orofacial region of a person, said housing shell and said support frame being configured to be secured together defining an enclosure therebetween;

b) radiation detection means mounted in said enclosure so that when being worn by a person, said radiation detection means is located in close proximity to an orofacial region of the person;

c) electronic control means connected to said radiation detection means for controlling operation of the radiation detection means; and d) computer processing means electrically connected to said electronic control means for processing signals from said radiation detection means.

The present invention also provides a method for detection of radionuclide contamination from inhalation, comprising:

a) positioning a mask over a person's orofacial region, the mask including a housing shell and a support frame, said support frame being contoured to cover the orofacial region of the person and defining an enclosure, the mask including a radiation detection means mounted in said enclosure so that when being worn by a person, said radiation detection means is located in close proximity to the orofacial region of the person; and b) processing an output of the radiation detection means using a computer processor means connected to said radiation detection means for detecting a presence or absence of radiation during breathing of the person.

The following drawings and detailed description provide additional information about the orofacial radiation detection device.

BRIEF DESCRIPTION OF THE DRAWINGS

The orofacial radiation detection device constructed in accordance with the present invention will now be described with reference to the drawings, in which:

FIG. 1 shows a front perspective view of a device for detection of inhaled radiation constructed in accordance with the present invention;

FIG. 2 shows a front perspective view of the device with facial region depicted;

DETAILED DESCRIPTION OF THE INVENTION

Figure 3:
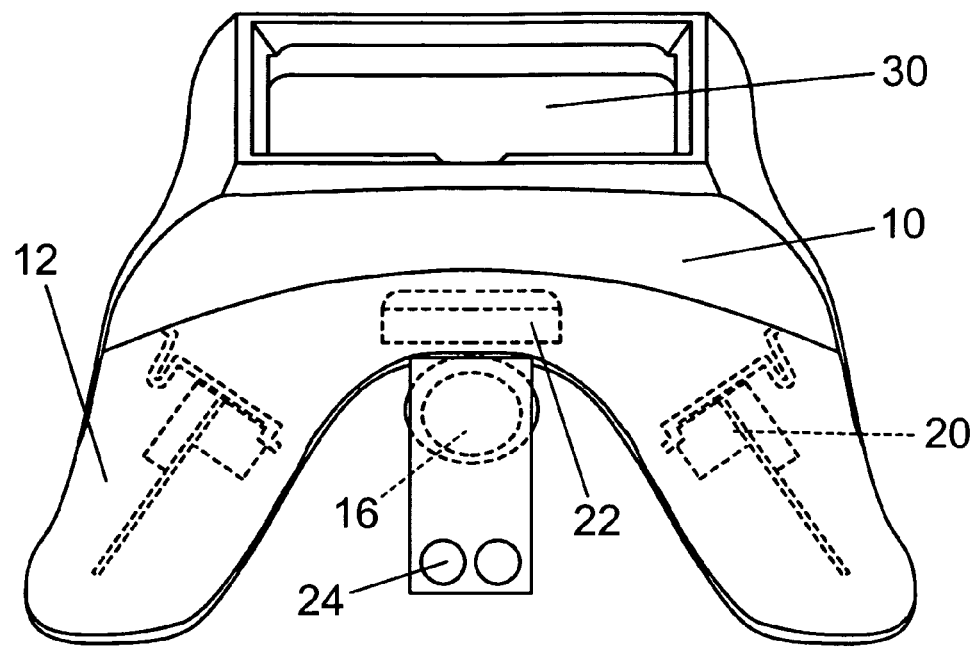
FIG. 3 shows a top view of the device of FIG. 1 with transparent detector housing area.

The systems described herein are directed, in general, to detection devices for rapid detection of internal radionuclide contamination from inhalation. Although embodiments of the present invention are disclosed herein, the disclosed embodiments are merely exemplary and it should be understood that the invention relates to many alternative forms. Furthermore, the Figures are not drawn to scale and some features may be exaggerated or minimized to show details of particular features while related elements may have been eliminated to prevent obscuring novel aspects. Therefore, specific structural and functional details disclosed herein are not to be interpreted as limiting but merely as a basis for the claims and as a representative basis for enabling someone skilled in the art to employ the present invention in a variety of manner. For purposes of instruction and not limitation, the illustrated embodiments are directed to all embodiments of detection devices for rapid detection of internal radionuclide contamination from inhalation.

As used herein, the term "about", when used in conjunction with ranges of dimensions, humidities, voltages or other physical properties or characteristics is meant to cover slight variations that may exist in the upper and lower limits of the ranges of dimensions so as to not exclude embodiments where on average most of the dimensions are satisfied but where statistically dimensions may exist outside this region.

The present invention addresses the problem of producing a mask having various types of radiation detectors mounted thereon for detection of radiation in the orofacial region of a person.

Referring to FIGS. 1 and 2, a half face radiological triage mask device shown generally at 100 is a molded design comprised of a housing shell 10, a support frame 12, a molded handle 32 and an adjustable head strap 14. A computer/microprocessor controller 30 is integrated into housing shell 10.

The support frame 12 is contoured to cover an orofacial region of a person, and the housing shell 10 and the support frame 12 are configured to be secured together defining an enclosure when secured together in which the various components of the mask, including different detectors, are mounted.

Figure 4:
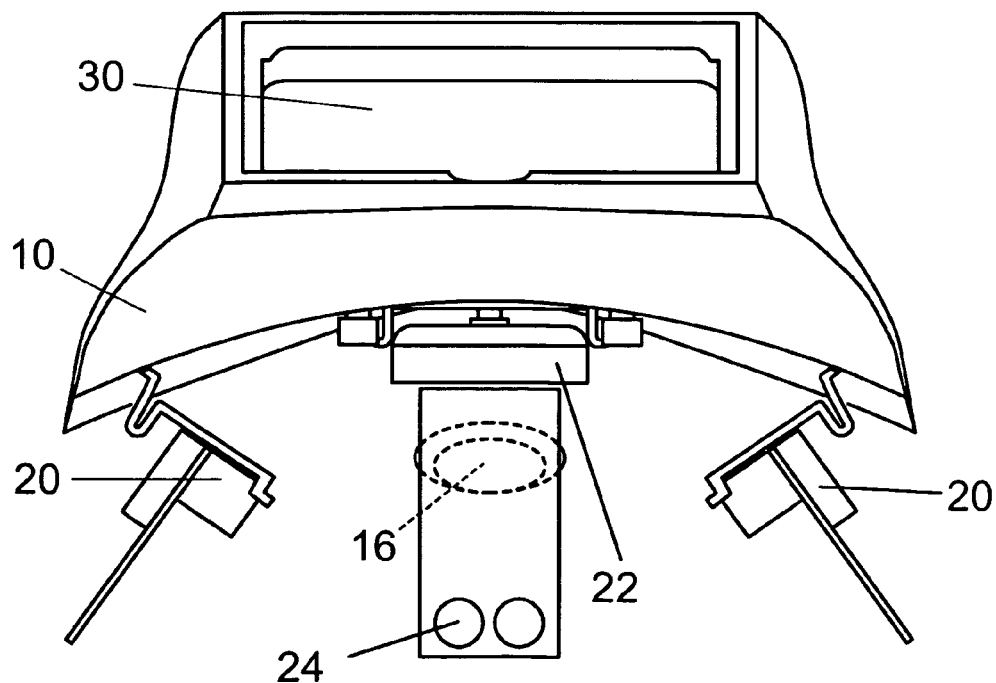
FIG. 4 is a top view of the device of FIG. 1 with the detector housing removed to clearly depict the detector locations.

In FIGS. 2, 5, 6, 7, and 8 the outline of the human orofacial region 40 of the person wearing mask device 100 being interrogated is depicted. Referring to FIGS. 3 and 4, three independent detectors 20, 22 and 24 are mounted in support frame 12. Detector 20 is a gamma ray detector and detector 24 is an alpha particle detector which may be mounted on a telescopic device (not shown) for extending and retracting detector 24. Detector 22 is a Geiger Müller (GM) detector. Frame 12 is ergonomically designed to provide optimal placement of detectors 20, 22 and 24 mounted thereon to be located on the frame 12 to be in close proximity to the orofacial (nose, mouth) region of the wearer. It has been designed based upon features of the $95^{th}$ percentile adult male face (Tilley, 1993). Shell 10 and frame 12 may be made of a semi-rigid high density polyethylene material, which allows for secure emplacement of the detectors 20, 22 and 24, and ease of cleaning.

Preferred gamma-ray detectors 20 used may be iGem™ CZT sensor modules; small circuit boards with embedded Cadmium Zinc Telluride (CZT) crystals and corresponding electronics. Cadmium Zinc Telluride (CZT) is a semiconductor based detector that directly converts x-ray and gamma-ray photons into electrons. CZT detectors provide spectroscopy and has a very high count rate at room temperature. The CZT crystal with associated detection electronics has a very small form factor which makes it easy to integrate into the construction of housing shell 10. The circuit board connected to the CZT detectors is connected to a host computing platform which will perform the spectroscopy analysis. Based on the analysis, the host computer will identify the radionuclide. The CZT detector operates as a true semiconductor. When photons interact with the atoms in the CZT material, electron hole pairs are generated. There are anode and cathodes electrodes on either side of the crystal which attract the negatively charged electrons and the positively charged holes. The electrons and holes collected create a detectable charge pulse which is output in the form of a voltage pulse from the preamplifier. The height of the voltage pulse is directly proportional to the incident energy of the incoming photons. The preamplifier feeds a signal into a shaping amplifier that converts the preamplifier output pulse to an amplified Gaussian pulse resulting signal is then fed into a Multi Channel Analyzer (MCA) and a spectrum is created that characterizes the incoming photons. The sensor module will only detect gamma-ray photons. Radionuclides that emit only alpha and beta particles cannot be identified through this method.

Geiger Müller (GM) detector 22 is preferably a pancake probe which is a gas filled detector. Detection is based on the collection of electrons and ions produced by ionizing particles in the gas. The typical detector configuration is comprised of an anode wire inside a cylindrical cathode. When voltage is applied between the electrodes, electrons and ions are attracted to the electrode. This generates an electric output signal which is then used by the electronics for amplification processing and storage. The pancake version of this type of detector 22 is preferred because it is ideal for the frame 12 because of its small form factor.

The alpha particle detector 24 is preferably either a silicon surface barrier detector or an avalanche photodiode detector or a PIN photodiode placed on a retractable telescopic arm which can be positioned in place either via manual winding, motor driven actuator system or spring-loaded retractor system. The alpha particle detector systems are classified as semiconductor detectors, and rely on the charged alpha particles interacting in the active layer of the (typically silicon) semiconductor material.

Figure 5:
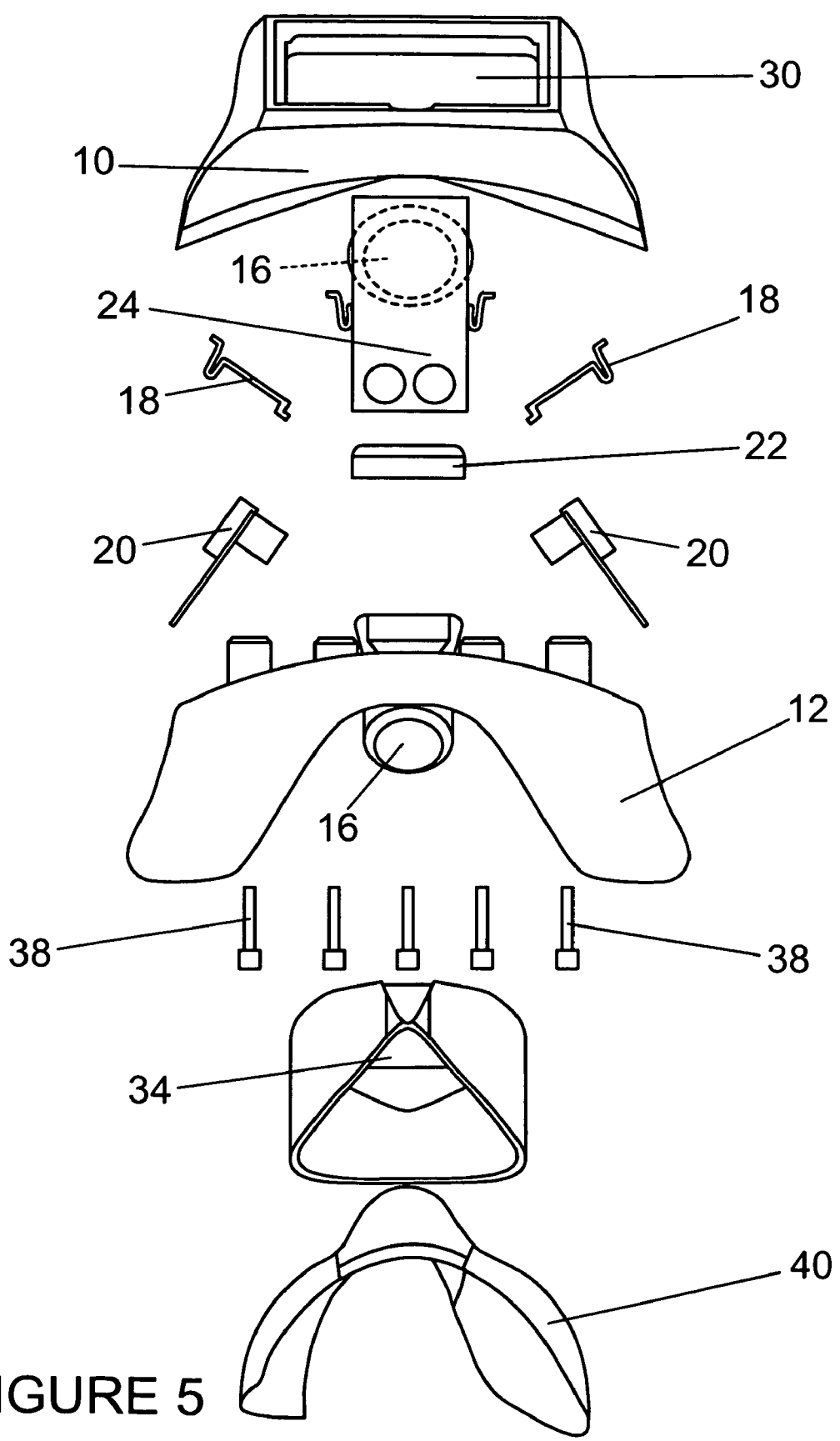
FIG. 5 shows a top exploded view of the device of FIG. 1 with the relative position of components.
Figure 6:
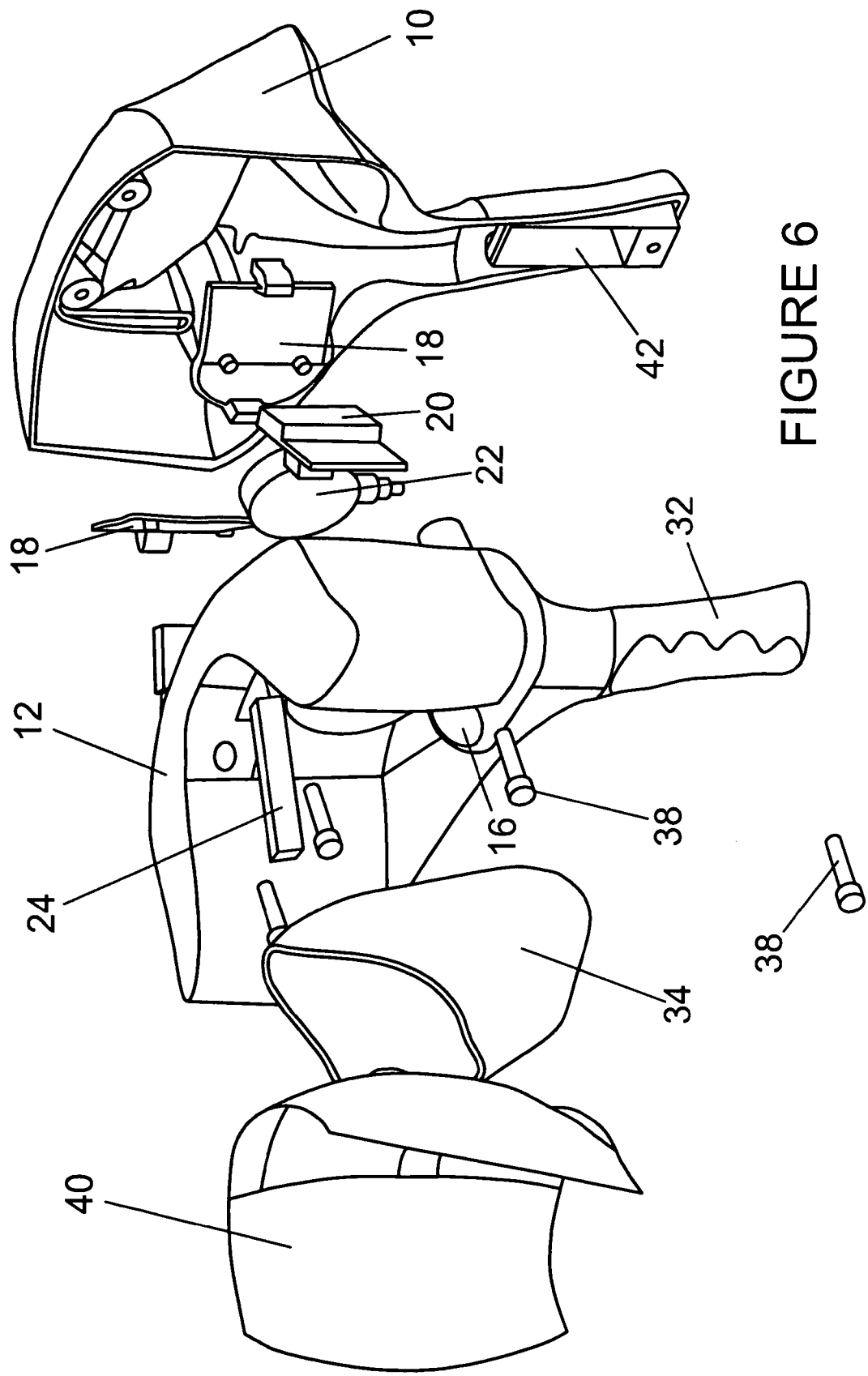
FIG. 6 shows a top-side forward facing exploded view of the device of FIG. 1 with the relative position of components.
Figure 7:
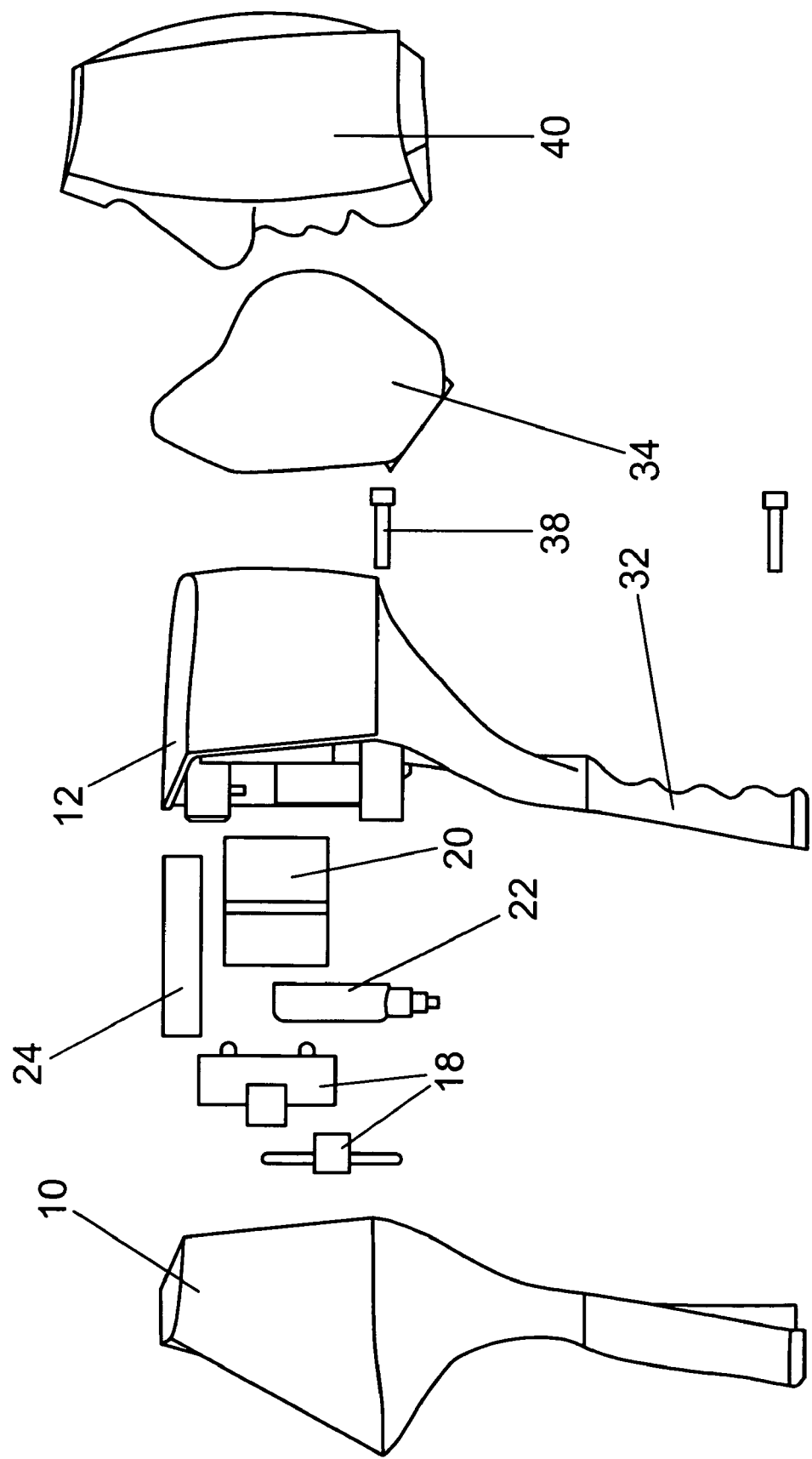
FIG. 7 shows a side facing exploded view of the device of FIG. 1 with the relative position of components.
Figure 8:
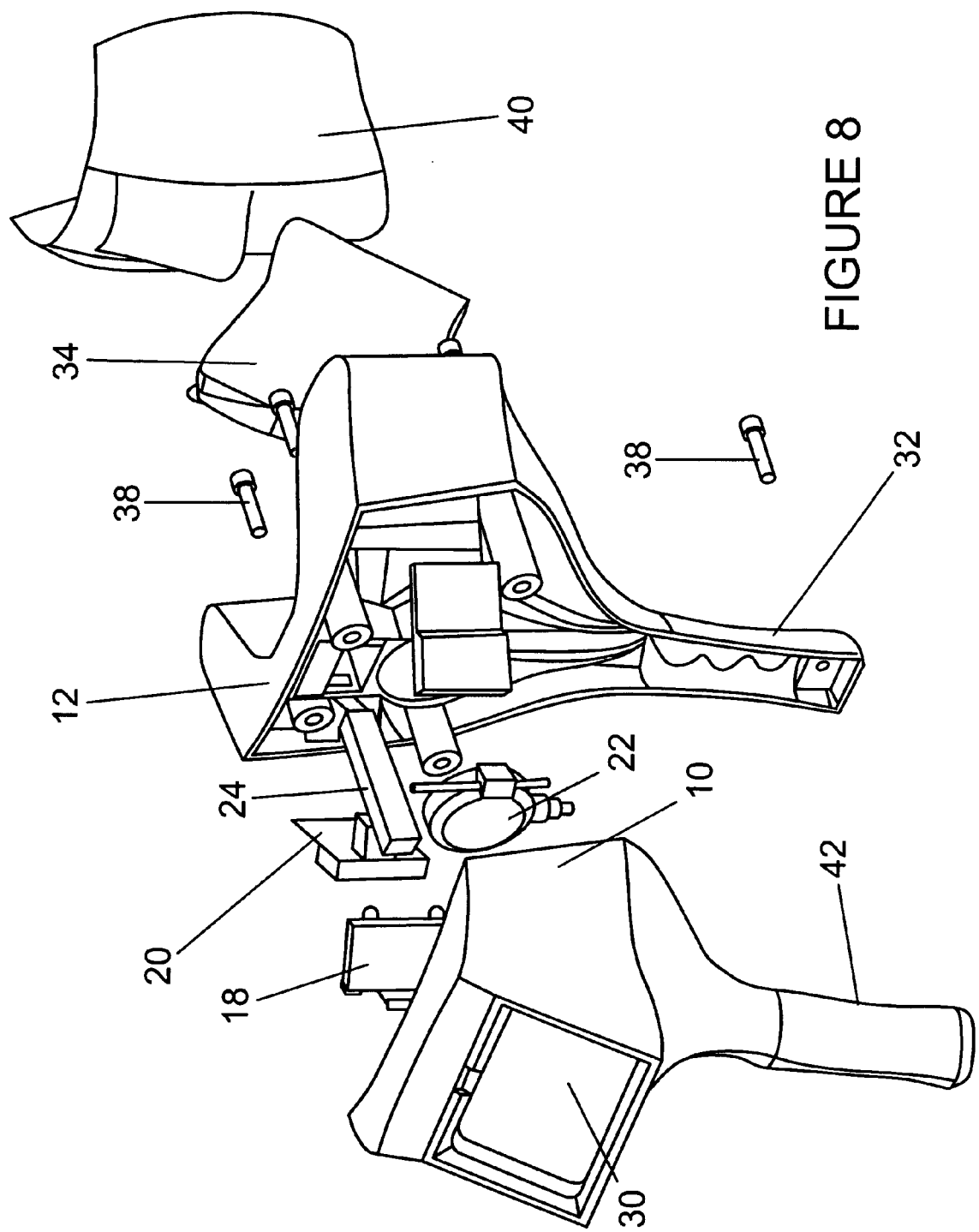
FIG. 8 shows a top-side rearward facing exploded view of the device of FIG. 1 with the relative position of components.

FIG. 5 and FIG. 7 are top and side planar views which depict the relative location of the mask components. Clips 18 are used to secure the gamma detectors 20 and GM detector 22 in place. The housing shell 10 and frame 12 are secured together using screws 38.

Handle 32 is preferably made of high density polyethylene and is made in two pieces, one piece being integrally formed with the housing shell 10 and the other with frame 12 and is designed to allow rigid support for placing the mask 100 near the orofacial region. The handle 32 is used as the battery storage compartment 42, which may be seen in FIG. 6 and FIG. 8.

A removable latex/rubber insert 34 is designed to quick snap connect 16 to the frame 12, which prevents direct contact between the frame 12 and the person being interrogated. On the insert 34 there is a male snap connector, while on the frame there is a female snap connector (or vice versa). The insert 34 snap locks into place. This allows for easy removal of the insert if it becomes contaminated.

This insert 34 may be a latex covered, foam filled shape that is designed to fit the $95^{th}$ percentile adult male face, and allow the mask 100 to touch the face at separate points to provide a consistent stand-off for the detectors 20, 22 and 24, without allowing the detectors to come into contact with the face. The quick snap connect allows for the insert 34 to be readily removed and replaced if contaminated. The device is not designed for an airtight fit, so that the person may still breathe. Further the mask is not designed for a tight fit on the face and the insert 34 has breather ports on the side to allow improved air circulation.

The optional head strap 14 may be fabricated of either polyethylene of nylon fabric, and is fully adjustable to the head circumference.

Electronics for the three detectors are attached with the housing shell 10 and frame 12 (except for the microprocessor interface/PDA 30 discussed below, which has its own power supply). The electronics compartment interfaces with the PDA (or other processor as discussed below), and has ports for recharging the batteries (or optionally, has a battery compartment).

A Personal Digital Assistant (PDA) 30 is mounted on the front surface of the housing shell 10 and is a computer platform used to allow input from the operator, perform data analysis and detection algorithms, and output results on a display screen of the PDA 30. The PDA 30 is light and has a small form factor, making it desirable for this application. Alternately, a cable can be attached to the PDA 30 connector and used with a laptop or desktop running an appropriate version of the software. It will be appreciated that the PDA may be replaced with any microprocessor-based computer or computer processor/microprocessor or customized microprocessor, or dedicated control unit preprogrammed. The computer processor may include a key pad mounted on the front of shell section 10 for use by the technician while the device is on the face of the patient for programming or data manipulation.

The device is designed to be self-contained in terms of operation and analysis of results. An optional mode of operation is to allow the device to communicate in a wireless fashion (via Bluetooth, WiFi or other appropriate wireless technology) with a base unit that may be located at a first responder base station, a hospital or some other suitable location n appropriate for the response.

There are two principle modes of operation for the device. The computer processor may be configured for two modes of operation and including a switch for switching between the two modes of operation. The first mode is to determine the presence of contamination in the orofacial region. A positive indication of contamination will be the main triage measurement. The second mode is to determine the isotope and provide an order of magnitude estimate of the internal contamination.

To operate the device, the electronics unit and PDA 30 are turned on and a systems check is performed while placed on a calibration standard. The calibration standard is in the form of a head anthropometric surface with calibration sources built in. After the systems check, the unit is ready to use.

For personnel suspected of being contaminated, the mask is placed via the handle 32 near the orofacial region. The shell 10, frame 12 and insert 34 is designed to approach a form fit of the human face, to the 95% adult male percentile. The insert 34 contacts the face (with or without an optional hygiene filter) and ensures a relatively consistent source-detector distance (within the limits of $95^{th}$ percentile adult human face). An optional disposable hygiene filter may be used to protect the device from cross-contamination, and is first placed on the person's mouth and nose area prior to placing the mask. A button is pressed to initiate a count, and visual/audible alarms sound to indicate contaminated or not contaminated. The estimation of contamination is obtained from a data synthesis of three independent detection types. As most radioisotopes emit gamma rays, the pair of semiconductor gamma ray detectors (Cadmium Zinc Telluride, CZT) 20 provide a signal which is analyzed via custom detection limit algorithms. In addition, most radioisotopes decay via beta emission, and therefore a Geiger-Muller (GM) detector 22 (which has sensitivity to alpha, beta and gamma radiation) and centrally located also provided a signal which is analyzed via custom detection limit algorithms. The location of this detector 22 provides reasonable line-of-sight to both the nasal and oral orifices. Alpha decay is prevalent only amongst heavy elements, and often have accompanying gamma radiation. However, to account for potential alpha contamination, the retractable alpha particle detector 24 (based on surface barrier, SSBD and/or avalanche photodiode, APD technology) can be positioned very near the orofacial region. The presence of alpha counts above background (which should be close to zero) would positively indicate alpha contamination, and therefore a simplistic detection limit algorithm is used.

A contamination result indicates to the operator performing the test that the individual requires a follow-on measurement to determine isotope and estimate activity. The contaminated person can then either be set aside for further investigation or analyzed on the spot (a triage or operational consideration).

Once a person has been confirmed contaminated via the triage mask 100, a second measurement must be taken to determine radioactive isotope and activity. In this case, a longer measurement is required, and to reduce movement and make the measurement more comfortable for both the operator and patient, head strap 14 can be placed such that the mask 100 keeps its position unassisted on the person's face. Upon pressing another button, the unit counts radiation emitted from the orofacial region. The primary measurement for determining radioisotope is gamma spectrum analysis from the dual CZT detectors 20. If no spectral peaks are observed, yet there are net counts via the GM detector, the most probably isotope is a pure beta emitter (of which there are relatively few) and a determination by exclusion can be performed. Determination of alpha emitters are performed by a specialized probe (SSBD, APD or PIN) 24 (shown in FIGS. 6 and 8) and again are determined via exclusion.

The detector circuitry, including high voltage power supplies and batteries, and contained in the mask 10 and in the frame 12. All computations involving detection limits and determination of contamination are performed via the computational platform: either a Microsoft Windows XP™ (or later) operating environment on a laptop (or desktop) computer, or the Personal Digital Assistant (PDA) 30 running the Windows Mobile™ operating system, or a customized microprocessor platform.

Optionally, one of the gamma ray detectors 20 may be replaced with a chemical and/or biological agent sensor, which would enable this device to respond to the full range of chemical-biological-radiological-nuclear (CBRN) threats. Alternatively, chemical and/or biological sensors may be included along with the three other detectors 20, 22 and 24. For example, sensors capable of ion mobility spectroscopy, infrared spectroscopy, or fluorescent spectroscopy may be included. These detectors are connected to the computer processor which can be programmed to analyse the output of the sensors in the same way they analyze the output of the radiation detectors.

As used herein, the terms "comprises", "comprising", "including" and "includes" are to be construed as being inclusive and open ended, and not exclusive. Specifically, when used in this specification including claims, the terms "comprises", "comprising", "including" and "includes" and variations thereof mean the specified features, steps or components are included. These terms are not to be interpreted to exclude the presence of other features, steps or components.

The foregoing description of the preferred embodiments of the invention has been presented to illustrate the principles of the invention and not to limit the invention to the particular embodiment illustrated. It is intended that the scope of the invention be defined by all of the embodiments encompassed within the following claims and their equivalents.

REFERENCES

Tilley (1993) The Measure of Man and Woman; Human Factors in Design, by Tilley, A. R., John Wiley and Son, NY.

Therefore what is claimed is:

1. An orofacial radiation detection device for detection of radionuclide contamination from inhalation, comprising:
    a) a housing shell and a support frame, said support frame being contoured to cover an orofacial region of a person, said housing shell and said support frame being configured to be secured together defining an enclosure therebetween;
    b) radiation detection means mounted in said enclosure so that when being worn by a person, said radiation detection means is located in close proximity to an orofacial region of the person;
    c) electronic control means connected to said radiation detection means for controlling operation of the radiation detection means; and
    d) computer processing means electrically connected to said electronic control means for processing signals from said radiation detection means.

2. The device according to claim 1 wherein said radiation detection means includes at least one gamma-ray detector, at least one Geiger-Muller (GM) detector, and at least one alpha particle detector.

3. The device according to claim 2 wherein said alpha particle detector is one of a silicon surface barrier detector and an avalanche photodiode detector.

4. The device according to claim 2 wherein said alpha particle detector is mounted on a telescopic arm which can be extended or retracted either via manual winding or by an actuator.

5. The device according to claim 2 wherein said at least one gamma-ray detector is a Cadmium Zinc Telluride (CZT) semiconductor based detector that directly converts x-ray and gamma-ray photons into electrons.

6. The device according to claim 1 wherein said computer processing means is a microprocessor.

7. The device according to claim 6 wherein said microprocessor is contained in a personal digital assistant (PDA) device.

8. The device according to claim 1 including an adjustable head strap connected to said support frame or said housing shell.

9. The device according to claim 1 wherein said computer processing means is configured to allow input from an operator, perform data analysis and detection algorithms, and outputting results graphically or visually.

10. The device according to claim 1 including one or both of a chemical and biological sensors mounted in said enclosure for detecting one or both of chemical and biological agents.

11. The device according to claim 1 wherein said computer processing means includes a visual display screen mounted in said housing shell and visible to an operator when the device is being worn by the person.

12. The device according to claim 1 wherein said computer processing means includes a key pad mounted in said housing shell and accessible by the user for programming the computer processing means.

13. The device according to claim 1 wherein said computer processing means is mounted in said housing shell.

14. The device according to claim 1 wherein said computer processing means is external to said device, including a computer connection in said housing shell for connecting to said computer processing means.

15. The device according to claim 1 including one or both of a visual and audible alarm to indicate contamination or non-contamination.

16. The device according to claim 1 including a replaceable insert mounted in said support frame contoured to fit against the person's face.

17. The device according to claim 1 including wireless communication means, wherein said computer processing means can communicate with a person remote from said person wearing said device.

18. The device according to claim 1 in which said computer processing means is configured for two modes of operation, a first mode of operation being for determining an indication of contamination, and a second mode of operation involving determining an isotope and a magnitude estimate of the internal contamination, including a switch for switching between the two modes.

19. A method for detection of radionuclide contamination from inhalation, comprising:
   a) positioning a mask over a person's orofacial region, the mask including a housing shell and a support frame, said support frame being contoured to cover the orofacial region of the person and defining an enclosure, the mask including a radiation detection means mounted in said enclosure so that when being worn by a person, said radiation detection means is located in close proximity to the orofacial region of the person; and
   b) processing an output of the radiation detection means using a computer processor means connected to said radiation detection means for detecting a presence or absence of radiation during breathing of the person.

20. The method according to claim 19 wherein said radiation detection means includes at least one gamma-ray detector, at least one Geiger-Muller (GM) detector, and at least one alpha particle detector.

21. The method according to claim 20 wherein said alpha particle detector is one of a silicon surface barrier detector and an avalanche photodiode detector.

22. The method according to claim 20 wherein said at least one gamma-ray detector is a Cadmium Zinc Telluride (CZT) semiconductor based detector that directly converts x-ray and gamma-ray photons into electrons.

* * * * *